(12) United States Patent
Tong

(10) Patent No.: US 11,305,444 B2
(45) Date of Patent: Apr. 19, 2022

(54) CHANGEABLE EFFICIENT PROTECTIVE TOOL

(71) Applicant: Jianlun Tong, Beijing (CN)

(72) Inventor: Jianlun Tong, Beijing (CN)

( * ) Notice: Subject to any disclaimer, the term of this patent is extended or adjusted under 35 U.S.C. 154(b) by 0 days.

(21) Appl. No.: 16/221,264

(22) Filed: Dec. 14, 2018

(65) Prior Publication Data

US 2019/0118399 A1 Apr. 25, 2019

Related U.S. Application Data

(63) Continuation of application No. 14/436,832, filed as application No. PCT/CN2012/083149 on Oct. 18, 2012, now abandoned.

(51) Int. Cl.
| | |
|---|---|
| *B26B 29/06* | (2006.01) |
| *A47J 9/00* | (2006.01) |
| *B26B 3/04* | (2006.01) |
| *B26B 5/00* | (2006.01) |
| *B26B 27/00* | (2006.01) |

(52) U.S. Cl.
CPC ............... *B26B 29/063* (2013.01); *A47J 9/00* (2013.01); *B26B 3/04* (2013.01); *B26B 5/008* (2013.01); *B26B 27/00* (2013.01); *B26B 27/002* (2013.01)

(58) Field of Classification Search
CPC ..... B26B 5/008; B26B 27/002; B26B 29/063; B26B 3/04; B26D 1/553; A21C 11/106
USPC ............................................ 30/116, 115, 114
See application file for complete search history.

(56) References Cited

U.S. PATENT DOCUMENTS

| | | | | |
|---|---|---|---|---|
| 4,432,137 A | * | 2/1984 | Okada ................... | B26B 25/005 30/292 |
| 5,090,124 A | * | 2/1992 | Althaus ............... | B26B 21/4006 30/50 |
| 5,480,031 A | * | 1/1996 | Maultasch .............. | B26B 27/00 206/525 |

(Continued)

FOREIGN PATENT DOCUMENTS

| | | | | |
|---|---|---|---|---|
| CH | 296968 A | * | 3/1954 | ............... B26B 3/04 |
| EP | 0273992 A1 | * | 7/1988 | ............. B26B 21/24 |
| JP | 2005179756 A | * | 7/2005 | |

OTHER PUBLICATIONS

English Translation of CH396968. (Year: 1954).*
English Translation JP2005179756 (Year: 2005).*

*Primary Examiner* — Jennifer S Matthews
(74) *Attorney, Agent, or Firm* — Houtteman Law LLC

(57) ABSTRACT

The present invention is a new-type kitchen cutting tool suitable to be used in households, canteens, restaurants etc. It is an entirely-new multi-edge protective cutting tool consisting of several blade units and the supporting cutting tool holder for holding the blade unit, used for cutting the food material into slices, shreds and dices. The blade unit may be changed so that the food material may be cut into slices, shreds and dices with different sizes and thicknesses. The cutting tool edge, the thin thread functioning as the cutting tool edge and the chopping board may be protected through the combination of the protective plate and the elastic blade or the thin thread, greatly extending their service life. The present invention is featured as easy operation, convenient, safe, high efficiency, raw material-, energy- and time-saved, wide application range and good quality of processed products.

4 Claims, 7 Drawing Sheets

(56) References Cited

U.S. PATENT DOCUMENTS

| | | | | |
|---|---|---|---|---|
| 2006/0218793 A1* | 10/2006 | Zucker | ................... | B26B 19/16 |
| | | | | 30/43.4 |
| 2007/0193689 A1* | 8/2007 | Haemerle | ................ | B26B 5/00 |
| | | | | 156/510 |
| 2007/0294898 A1* | 12/2007 | Beltran | ................... | B26B 5/008 |
| | | | | 30/307 |

* cited by examiner

CHANGEABLE EFFICIENT PROTECTIVE TOOL

CROSS REFERENCE TO RELATED APPLICATIONS

This application is a continuation application of prior application Ser. No. 14/436,832 filed on Apr. 17, 2015, now pending, which is a national stage application of the international application No. PCT/CN2012/083149, filed on Oct. 18, 2012, the entire contents of which are incorporated herein by reference.

TECHNICAL FIELD

The present invention involves a cutting tool consisting of a blade unit with several blades and a supporting cutting tool holder for holding the blade unit. After the blade unit is assembled with the cutting tool holder, they may be used to cut food material, mainly applied in the cooking area, and sometimes, also applied in other areas where cutting is required.

BACKGROUND TECHNOLOGIES

People usually need to cut vegetables into slices, shreds and dices when making food. Traditional kitchen cutting tools are laborious and it is hard to control the finesse during processing. Sometimes our hand may be accidentally cut, or the vegetables are sticky to the cutting tool. In case of spicy vegetables, we have to endure their sting to eyes, which makes us very uncomfortable. Sometimes, different processing patterns are required, and sometimes the food material should be cut on different planes. The rub bed on the market may squeeze the vegetables during processing, resulting in the compromised taste of them. Electric cutting tools need electricity, and hard to maintain, so they are not suitable to be used in households or small canteens. In general, some energy is consumed by the material being cut, some is consumed by the cutting tool edge and the chopping board, and so the latter two are badly worn, badly reducing their service life. In the structure of the utility patent with Application No. 200920255826.7, several cutting tools are combined together in parallel, and there is one handle on either side, so both hands are required to operate. In the utility patent with Application No. 200920001966.1, several cutting tools are combined in parallel in the same container. In these two patents, the distance between the blades is fixed, and the blade unit cannot be changed, so the processed material only has a single size. In the utility patent with Application No. 201020293206.5, several cutting tools are combined together in parallel, and the distance between the blades can be adjusted, but its structure is so complex, and the adjustment distance is hard to control. Besides, the cutting tool is inconvenient to maintain. And there is only one handle and which is set on the outer side, not easy to operate.

SUMMARY OF THE INVENTION

To solve these problems, the new-type cutting tool is developed. It consists of several blade units with a protective plate and the supporting holder for the blade units. The cutting tool may be operated by one hand, and no electricity is required, greatly improving the processing speed, accuracy, quality and sanitation, and ensuring the user's safety and comfort. The protective plate plays a role in protecting the cutting tool edge. When the cutting tool is being used, part of the useful energy is consumed by the material being cut, and another part of the energy is consumed on the cutting tool edge, the elastic part of the cutting tool edge, the chopping board and the protective plate. The cutting tool edge and the protective plate share the useless and harmful loss of energy, thus greatly extending the service life of the cutting tool edge and the chopping board. Cutting is the function of the cutting tool edge, and it nearly has nothing to do with the cutting tool body, so a thin thread made with a special elastic material may be used to substitute for the cutting tool edge. To simplify the description, it is declared hereby: the cutting tool edge referred to in the present invention include the elastic and inelastic cutting tool edges or the elastic and inelastic thin threads instead of the cutting tool edge. Specifically, the present invention is a new-type safe cutting tool that can cut the food material into slices, shreds or dices by 1 to 3 times of cutting. For each individual blade unit: 1. If the distances between individual blades are equal to each other, the food material being cut will be equally divided; 2. If the distances between individual blades are not equal to each other, the food material being cut will be not equally divided; 3. All the blades may be of the same size or different sizes. 4. Except for a few blades which function for stabilizing, the other blades may be substituted by the elastic thin threads playing the same role as the cutting tool edge. The thin thread substituting for the cutting tool edge is made of a special material. Besides, the width of the cutting tool edge or the circumscribed circle diameter of the cross-section of the thin thread is less than 3 mm. Each of the blade units may be set with its own blade spacing, so as to obtain the cut food material with different sizes and thicknesses by changing the blade unit. The height of the protective plate shall be within 30 mm and it should also be larger than that of the blade unit. The use of the protective plate as well as the elastic blade or the elastic thin thread instead of the cutting tool edge, can greatly extend the service life of the cutting tool edge or the thin elastic thread and the chopping board.

Technical Solution

Definition of items: Sharp Face: refers to the cutting surface formed by all the cutting tool edges or thin threads, with the meaning of sharp cutting surface. n: refers to any number less than 5, and may be a decimal. As the chopping board may be not an absolutely-flat plane, the following protection methods should be applied: 1 If the food material needs to be cut off, there should be a distance of n (mm) between the sharp face length and the protective plate. The elasticity of the sharp face shall be large enough so that the sharp face may be shielded by the protective plate. 2. If the food material needs to be basically cut off, the sharp face and the lower end of the protective plate should be in the same plane. The elasticity of the sharp face is only required to be within n (mm). 3. If the food material needs to be cut as tangled, the sharp face shall be n (mm) shorter than the lower end of the protective plate. The sharp face may be not elastic, or with the elasticity of several millimeters. Specific Description: A new-type cutting tool is composed of cutting tool handles (1), cutting tool holder (2) and blade units (3). The cutting tool handles (1) and the cutting tool holder (2) are installed on the blade unit (3). The blade unit (3) is composed of the protective plate (7) and some blades. The sharp face formed by the cutting tool edges (4) should be fit well with the protective plate. The obtuse side formed by the blade back should be more than 1 mm shorter than the protective plate; when desired, each blade shall have the elastic deformation capacity of more than n (mm) or above lest the protective plate (7) loses its function to protect the cutting tool edge (4); each blade itself has several small holes (10). The cutting tool handle and the cutting tool holder are assembled with the blade unit, the blade unit is composed of two protective plates and a plurality of cutting blades arranged between the two protective plates, and the cutting tool holder has two arms removably fixed with the two protective plates, respectively, wherein the two protective plates each has an upper portion, each of the two protective plates has a protrusion block formed on an outside surface thereof, the protrusion block has a slot formed therein, a lower portion of each of the two arms of the cutting tool holder has a bottom bar and an upper bar, the bottom bar is formed on the bottom of each of the arm of the cutting tool holder, the bottom bar, the upper bar, and the arm form a ± shape, the bottom bar and the upper bar are parallel to each other and both are perpendicular to the arm, the upper bar has a facing down opening slot, when the cutting tool holder is fixed with the protective plates, each upper portion of the protective plates is slidely inserted into a corresponding facing down opening slot of the upper bar, and each bottom bar of the cutting tool holder is inserted into a corresponding slot in the protrusion block.

Beneficial Effects

1. Simple structure; thin, short and small blades; and processing material, energy and time saved; 2. Vegetables will not be stuck onto the blade, easy to operate, safe and comfortable, suitable for households, canteens, etc.; 3. Suitable for easily and quickly cutting special vegetables with sting to eyes like onions and peppers; 4. The blade unit may be changed as desired, easy to disassemble and clean; 5. It can make the food material into slices or shreds by cutting for the first time; or into dices by cutting for the second or third time. No further chopping is needed, which retains the vegetable nutrients to the greatest degree, greatly improving the work efficiency; 6. The combination of the protective plate and the elastic cutting tool edge or the thin thread, greatly extends the service life of the cutting tool edge or the thin thread and the chopping board, featured as energy-saving and environmental protection; 7. Any person with one arm disabled can use it: the cutting tool may be completely operated by one hand, without needing the support of the other hand; 8. Once the blade unit cannot work smoothly, it may be replaced with a new one, and the cutting tool holder may be continuously used in the recycling form; 9. Because of the development of the present invention, the vegetable processing can also become a kind of art: you can quickly and easily perform various kinds of fancy processing and create many art patterns.

DETAILED DESCRIPTION OF THE EXEMPLARY EMBODIMENTS

Figure 1:
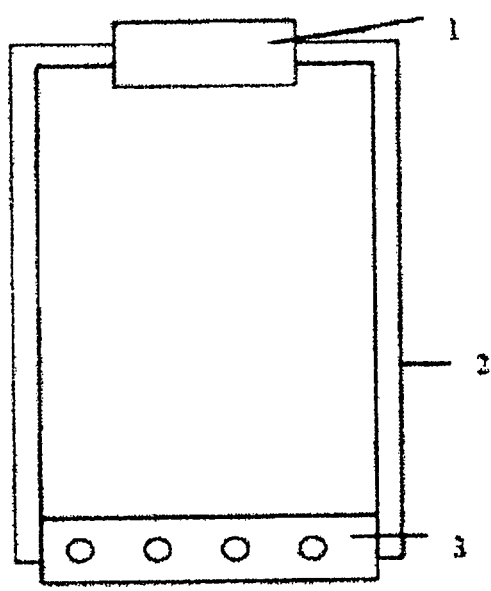
FIG. 1 is the front view of the cutting tool.
Figure 2:
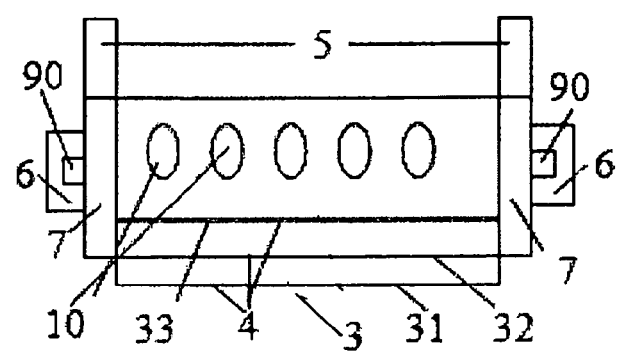
FIG. 2 is the front cross-sectional view of the blade unit.
Figure 7:
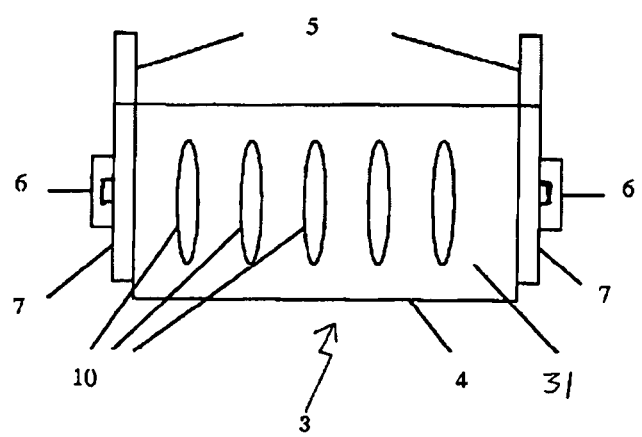
FIG. 7 is a front cross-sectional view of a blade unit according to an example embodiment.

Referring to FIGS. 1-4, a cutting tool according to an example embodiment of the present application is composed of a cutting tool handle 1, a cutting tool holder 2 and a blade unit 3. The cutting tool handle 1 and the cutting tool holder 2 are assembled with the blade unit 3. According to an example embodiment, the blade unit 3 is composed of two protective plates 7 and a plurality of cutting blades 31,32,22 arranged between the two protective plates 7 as shown in FIG. 2, which is a front cross-sectional view of the blade unit 3. According to another example embodiment, the blade unit 3 is composed of the two protective plates 7 and a plurality of thin threads arranged between the two protective plates. The plurality of cutting blades or thin threads may be arranged between the two protective plates 7 in different ways. As the chopping board may be not an absolutely-flat plane, the following arrangements of the plurality of blades or thin threads may be applied to following three different cases: case 1, If the food material needs to be completely cut off, the sharp face 4 of the blades or thin threads should be extended from the lower end of the protective plates 7 by a distance of n (mm), in which n is a number less than 5 and the sharp face 4 refers to the cutting edges formed by all the cutting blades or thin threads. As shown in FIG. 2, the reference number 31 refers to the arrangement of the cutting blades in this case. The elasticity of the sharp face shall be large enough so that the sharp face may be shielded by the protective plate. Case 2, If the food material needs to be basically cut off, the sharp face of the blades or thin threads and the lower end of the protective plate should be in the same plane. As shown in FIG. 2, reference number 32 refers to the cutting blades in this case. The elasticity of the sharp face is only required to be within n (mm), in which n is a number less than 5. Case 3, if the food material needs to be cut as tangled, the sharp face shall be n (mm) shorter than the lower end of the protective plate. The sharp face may be not elastic, or with the elasticity being of several millimeters. As shown in FIG. 2, reference number 33 refers to the cutting blades in this case. For illustration purpose only, FIG. 2 shows three different cases in a same drawing. In reality, the three cases may be three different embodiments. For example, FIG. 7 is a drawing showing only the first case. Also, in another example embodiment, these three types of arrangements may be combined together in a same blade unit.

Figure 3:
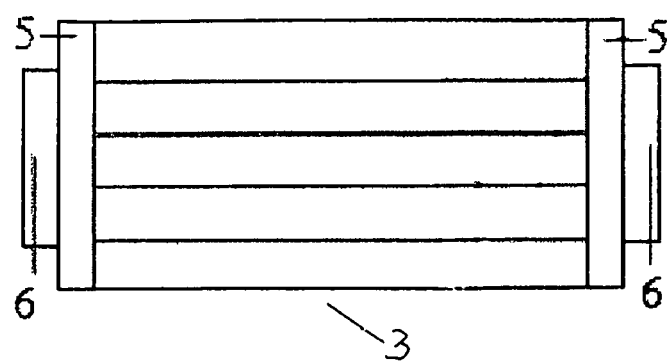
FIG. 3 is the top view of the dicing blade unit according to an example embodiment.
Figure 4:
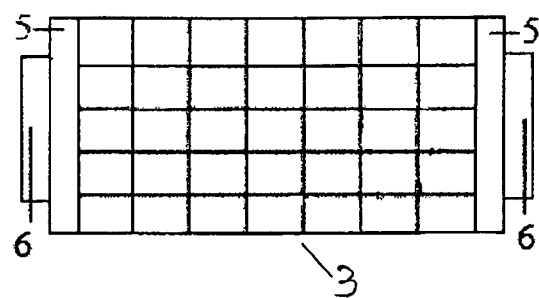
FIG. 4 is the top view of the shredding blade unit according to another example embodiment.
Figure 5:
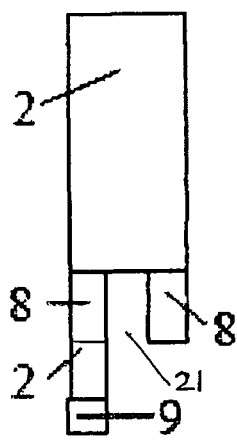
FIG. 5 is a front view of a lower portion of the left arm of the cutting tool holder.
Figure 6:
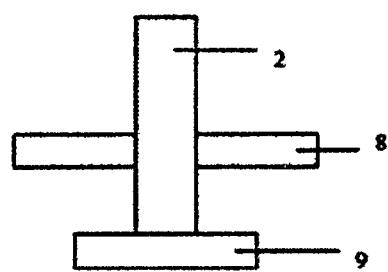
FIG. 6 is a side view of the lower portion of the left arm of the cutting tool holder.

The cutting tool holder 2 has two arms removably fixed to the two protective plates 7, respectively. For illustration purpose only, the two arms may include a left arm and a right arm as shown in FIG. 2, which is a front view of the cutting tool. FIG. 3 is a top view of a blade unit 3 having a plurality of cutting blades arranged in parallel between the two protective plates 7 according to an example embodiment. FIG. 4 is a top view of a blade unit 3 having a plurality of blades intersected one another according to another example embodiment. The sharp face 4, which refers to the cutting edges formed by all the cutting blades or thin threads, should be fit well with the protective plate. The obtuse side formed by the back of the cutting blades should be more than 1 mm shorter than the protective plate; when desired, each cutting blade shall have the elastic deformation capacity of more than n (mm) or above lest the protective plate 7 loses its function to protect the blade edge; each blade itself has several small holes 10, which are shown in FIG. 2. The two protective plates 7 each has an upper portion 5 as shown in FIG. 2. A protrusion block 6 is formed on outside surfaces of the two protective plates 7, respectively. Referring to FIGS. 2-4, the protrusion block 6 may be of a rectangular shape in an example embodiment. The protrusion block 6 may be of any other shapes, such as a circular shape, or a square shape. A slot 90 is formed in the protrusion block 6. The cross section of the slot 90 is of a rectangular shape as shown in FIG. 2. It may be of any other shapes such as a square shape or a circular shape. FIG. 5 is a front view of a lower portion of the left arm of the cutting tool holder 2. FIG. 6 is a side view of the lower portion of the left arm of the cutting tool holder 2. As shown in FIG. 6, the lower portion of the left arm of the cutting tool holder 2 has a bottom bar 9 and an upper bar 8. The bottom bar 9 is formed on the bottom of the left arm of the cutting tool holder 2. The bottom bar 9, the upper bar 8, and the left arm form a ± or a "t" shape. The bottom bar 9 and the upper bar 8 are parallel to each other and both are perpendicular to the left arm. The cross section of the bottom bar 9 is of a rectangular shape matching with the rectangular shape of the slot 90 in the protrusion block 6. The cross section of the bottom bar 9 may be of any other shapes such as a circular shape or a square shape, as long as the shape matches with the shape of the cross section of the slot 90. From the front view, the upper bar 8 has a facing down opening slot 21. When the cutting tool holder 2 is fixed with the protective plates 7, the upper portion 5 of the protective plates 7 is slidely inserted into the facing down opening slot 21 and the bottom bar 9 of the cutting tool holder 2 is inserted into the slot 90 in the protrusion block 6. The right arm of the cutting tool holder 2 has a same structure as the left arm and work the same way with the protective plates 7.

In an example embodiment, the width of the cutting edge of the cutting blades or the circumscribed circle diameter of the cross-section of the thin thread is less than 3 mm. Each of the blade units may be set with its own blade spacing, so as to obtain the cut food material with different sizes and thicknesses by changing the blade unit. The height of the protective plate shall be within 30 mm and it should also be larger than that of the blade unit.

Many people like stuffed foods like dumplings, steamed buns etc., but they are tired of so much work in stuffing preparation, and now the problem is solved with this cutting tool: Only a few times of cuttings is required in the same work which previously needed tens of minutes of labor. If the complete-cutoff shredding blade unit is used, a cutting tool edge face with the cross section of 2 $m^2$ is formed by four adjacent edges with the spacing of 2 mm; cutting for the first time can make the food material into shreds with the cross-section of 2 $m^2$, and after cutting for the second time, the shreds will become dices with the cross-section of 2 $m^3$. No further cutting or chopping is required, and the nutrients of the vegetables will be retained to the greatest degree as well.

THE MODE TO APPLY THE PRESENT INVENTION

The following is the simplest scheme as the example, and it will not be used as the limit for the scope of the present invention.

1. Specific implementation scheme: Using the slicing blade unit shown in FIG. 3: Cutting for the first time makes the food material become slices; cutting it for the second time, the slices Shredding blade unit shown in FIG. 4: Cutting for the first time makes the food material become shreds, and cutting for the second time, the shreds will become dices.

2. The blade units may be selected depending on the number of dining people; ① For a family with 3-5 persons, the small-size cutting tool with the cross-section less than 25 $cm^2$ shall be used; ② For canteens, the medium-size cutting tool with the cross-section of about 100 $cm^2$ shall be used; and ③ For more dining people, the large-size cutting tool shall be used.

3. Individual blades may be selected according to personal tastes or their tooth health conditions; some people like soft food, and some people like a little hard food, some people have good teeth and some people have bad teeth. (1) If all the dining people have the same demands: the spacing between the blades shall be designed to be equal with each other (2) If not all dining people have the same demands: the spacing between blades shall be set differently. Part of the food materials apply to a larger spacing and the remaining apply to a smaller spacing.

4. The individual blades may be selected according to the food material to be cut: the meat needs to be completely cut off, so the blade unit with the sharp face longer than the protective plate shall be used; for the fruits and vegetables, the blade unit with the sharp face equal to or shorter than the protective plate should be used.

5. Comparison with the effects of competitive cutting tools: (1) Let's take the case of cutting a potato as the easiest example: 10 times of cutting is generally required to make the potato become slices, 20 times of cutting required to make it become shreds, and 30 times of cutting required to make it become deices; but with this cutting tool, only one time of cutting is required to obtain slices, one or two times of cutting required for shreds and two or three times of cutting required for dices. (2) Even if a rub bed is used, several times of cutting is required to get the desired shapes. In addition, the taste of the vegetables will be compromised since being squeezed during processing.

6. Suitable for cutting the vegetables with sting to eyes like onions and peppers: only 1 to 3 times of cutting is required for this work.

7. If only one edge is used, then this cutting tool is a kind of new kitchen cutting cutting tool with a small blade.

8. The sharp face may be made into various shapes. In principle, this is possible as long as the graph is on a two-dimensional plane. But, the processing with such a sharp face is kind of difficult: 1. Simple geometric shapes: triangle, square, pentagonal magnitude, triangle, quadrilateral, pentagon, etc., 3. Various kinds of round shapes and various radians. Complex patterns such as a variety of small animals are also possible to be made.

9. The sharp face may be three-dimensional: It is easy to make various shapes if the edges are not arranged in the same plane. For example, the sharp face may be designed as the star shape, with the middle part as the upward-concave arc shape. In this case, a tomato may be cut into a pentagonal shape but the intermediate and the bottom are still connected with each other, which is easy to place and looks good.

10. The present invention may be designed into several series of large product lines to make the user company turns up its nose at the world for 20 years!

What is claimed is:
1. A cutting tool, comprising:
a cutting tool handle;
a cutting tool holder; and
a blade unit;

wherein the cutting tool handle and the cutting tool holder are assembled with the blade unit, the blade unit is composed of two protective plates and a plurality of thin thread arranged between the two protective plates, and the cutting tool holder has two arms removably fixed with the two protective plates, respectively, the two arms of the cutting tool holder together forming a first plane, the two protective plates being parallel to each other and each having an outside surface, the first plane being perpendicular to the outside surface, wherein the two protective plates each has an upper portion, each of the two protective plates has a protrusion block formed on the outside surface thereof, the protrusion block has a slot formed therein, a lower portion of each of the two arms of the cutting tool holder has a bottom bar and an upper bar, the bottom bar is formed on the bottom of each of the arm of the cutting tool holder, the upper bar is longer than the bottom bar, the upper bar has a middle portion connected to the arm of the cutting tool holder, the bottom bar has a middle portion connected to the bottom of the arm of the cutting tool holder, the bottom bar and the upper bar are parallel to each other and both are perpendicular to the arm, thus the upper bar, the bottom bar and the arm form a ±shape, the upper bar has a facing down opening slot, when the cutting tool holder is fixed with the protective plates, each upper portion of the protective plates is slidely inserted into a corresponding facing down opening slot of the upper bar, and each bottom bar of the cutting tool holder is inserted into a corresponding slot in the protrusion block.

2. The cutting tool according to claim 1, wherein each of the plurality of thin thread has elasticity and thus is elastically deformable.

3. The cutting tool according to claim 1, wherein a sharp face formed by thin thread is in a same plane with a lower end of the protective plates.

4. The cutting tool according to claim 1, wherein a sharp face formed by the thin thread can have a different two-dimensional or three-dimensional shape.

* * * * *